Jan. 2, 1934.　　　　A. W. ALTVATER　　　　1,941,966
CUTTING, TRIMMING, AND ORNAMENTING MACHINE
Filed April 20, 1931　　　7 Sheets-Sheet 1
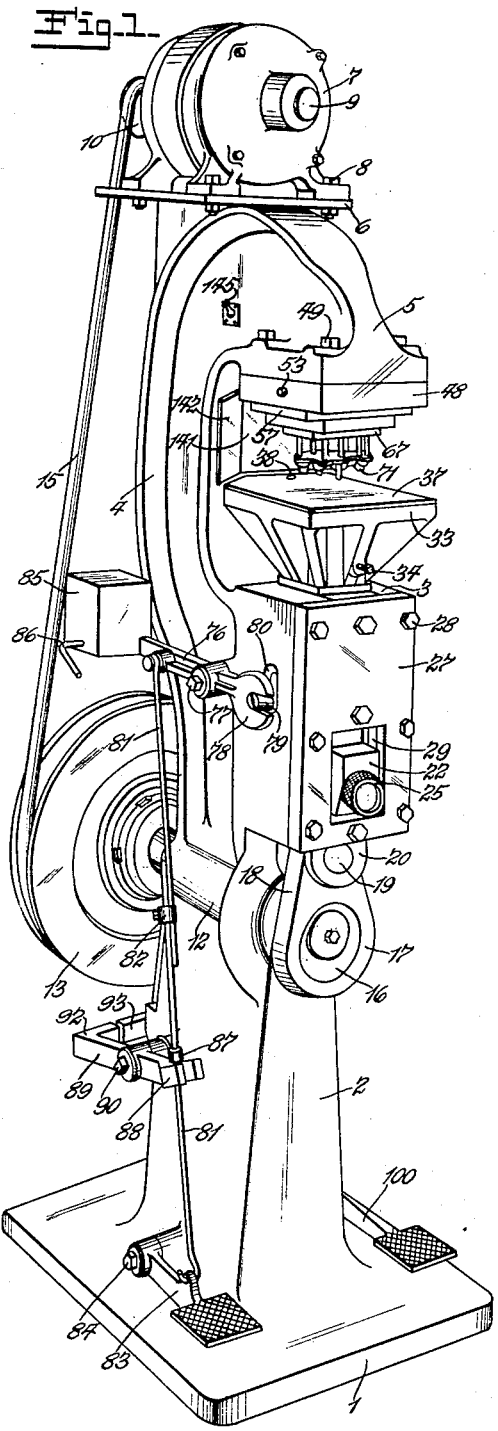
Inventor
Arthur W. Altvater
by Kipsey & Kingsland
His Attorneys Jan. 2, 1934.  A. W. ALTVATER  1,941,966
CUTTING, TRIMMING, AND ORNAMENTING MACHINE
Filed April 20, 1931  7 Sheets-Sheet 2
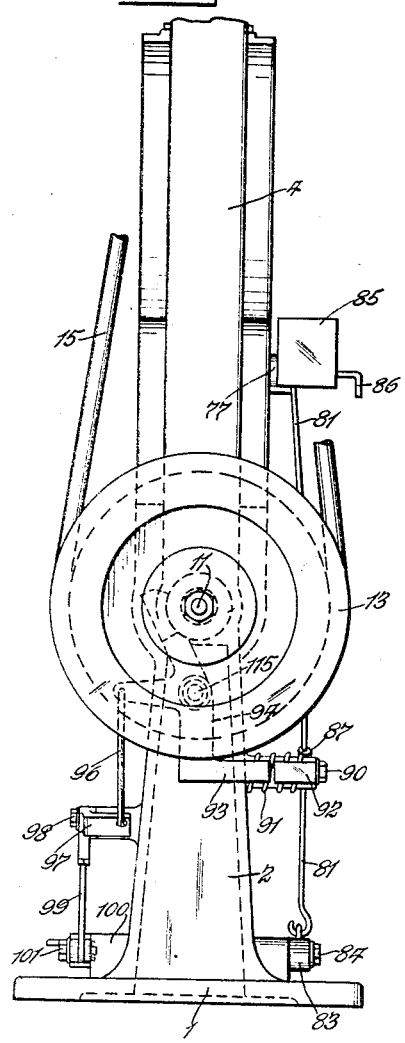
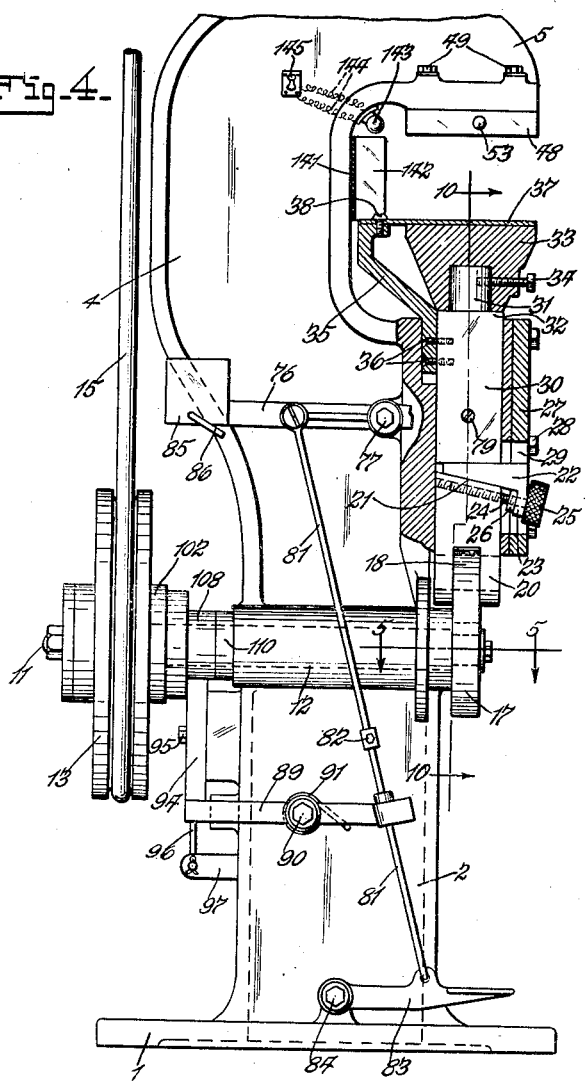
Inventor
Arthur W. Altvater
by Rippey & Stingland
His Attorneys Jan. 2, 1934.    A. W. ALTVATER    1,941,966
CUTTING, TRIMMING, AND ORNAMENTING MACHINE
Filed April 20, 1931    7 Sheets-Sheet 3
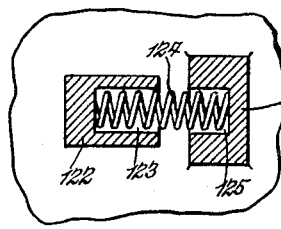
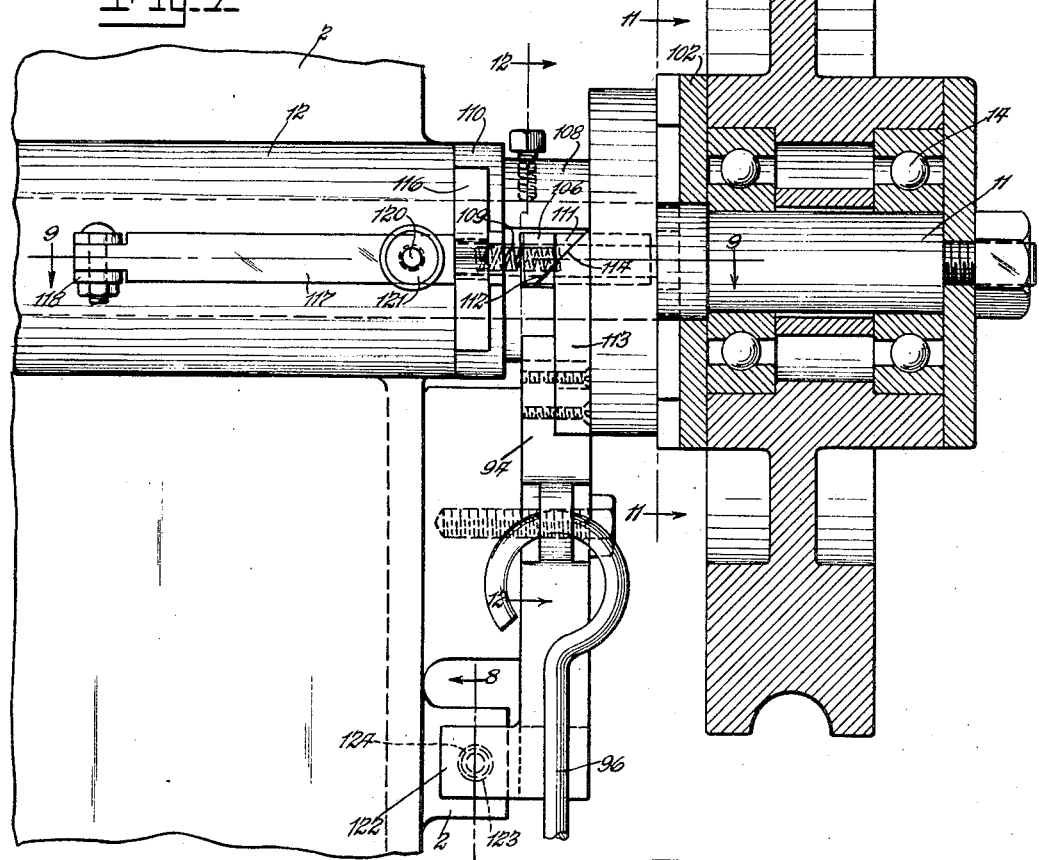
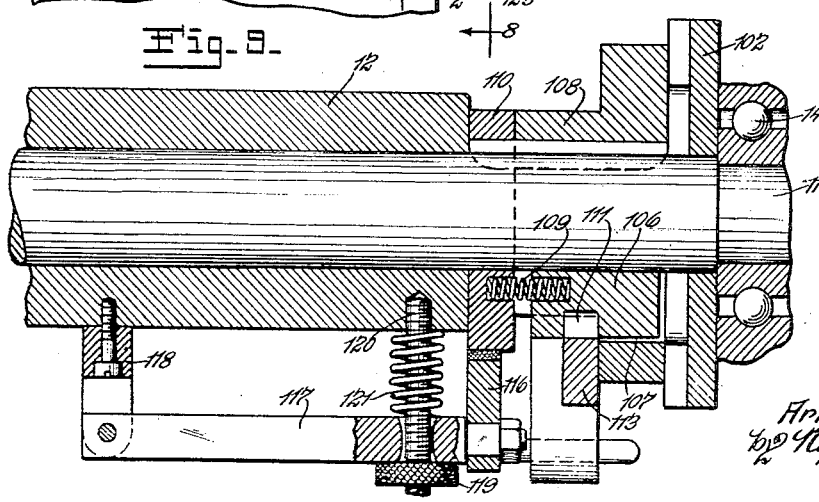

Jan. 2, 1934.  A. W. ALTVATER  1,941,966
CUTTING, TRIMMING, AND ORNAMENTING MACHINE
Filed April 20, 1931    7 Sheets-Sheet 4
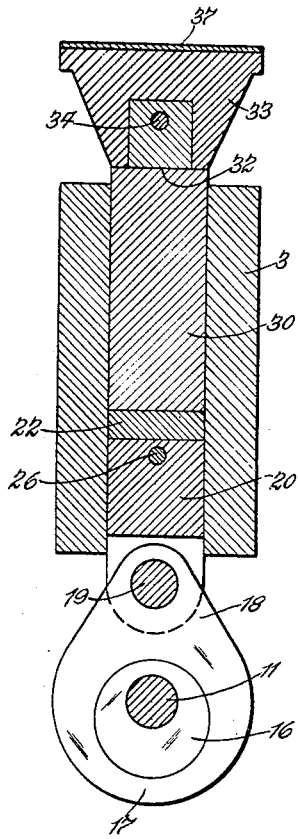
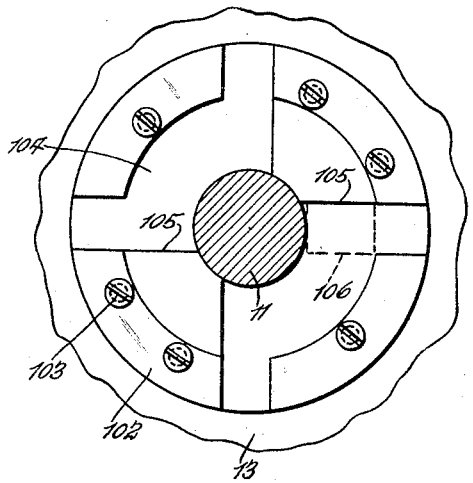
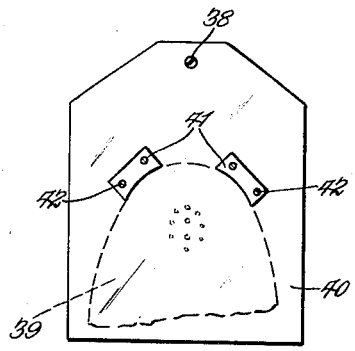
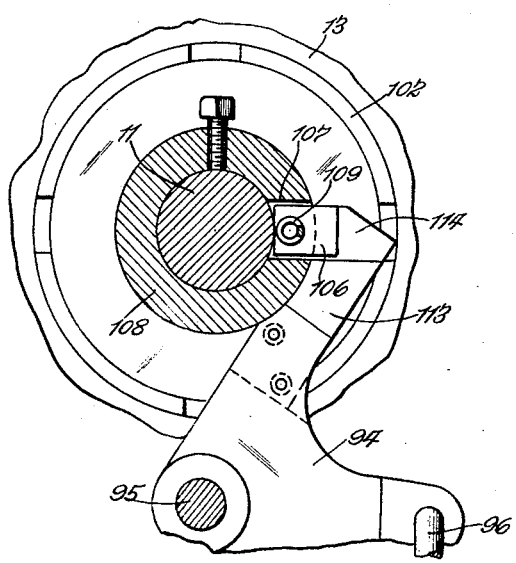
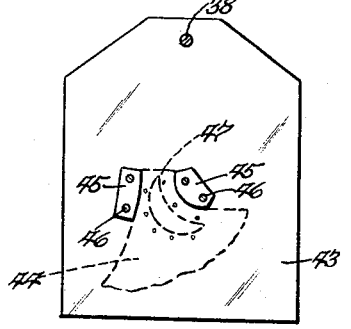

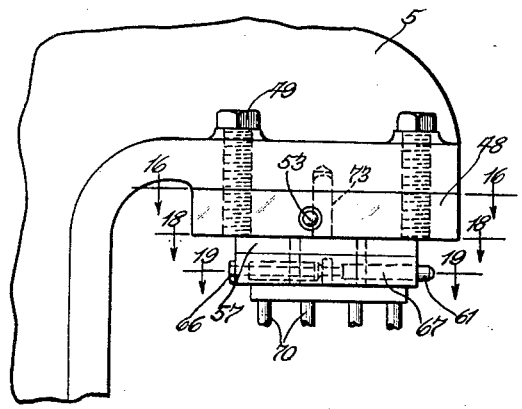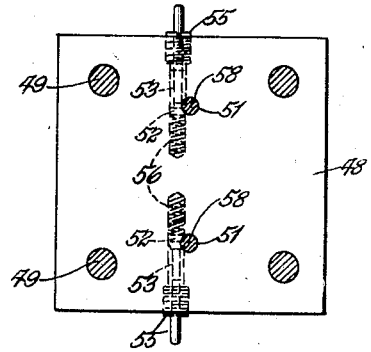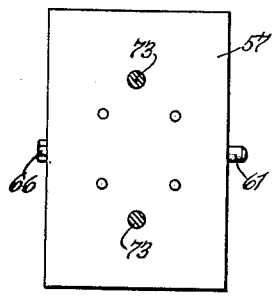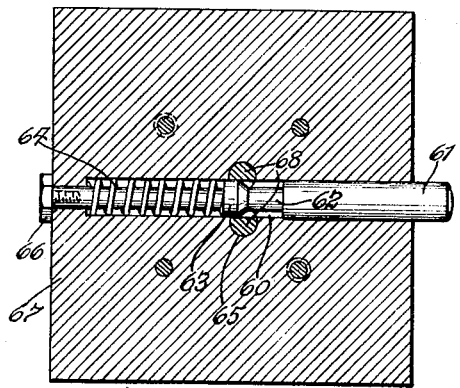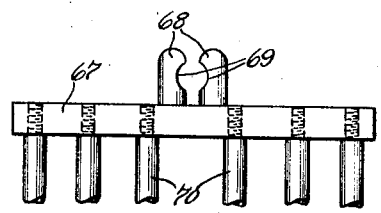

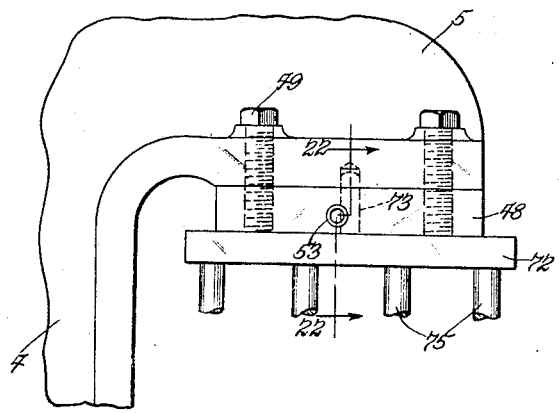
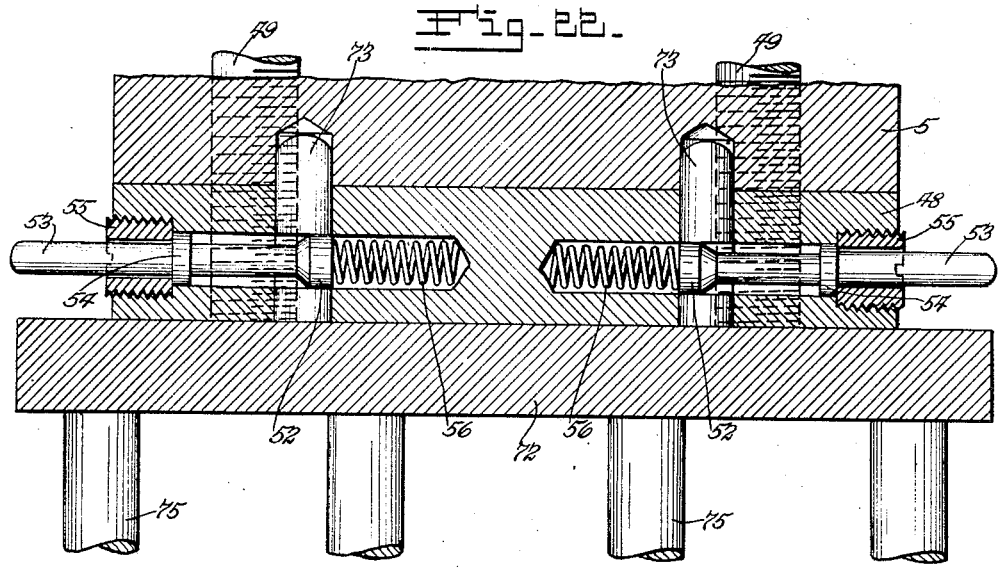
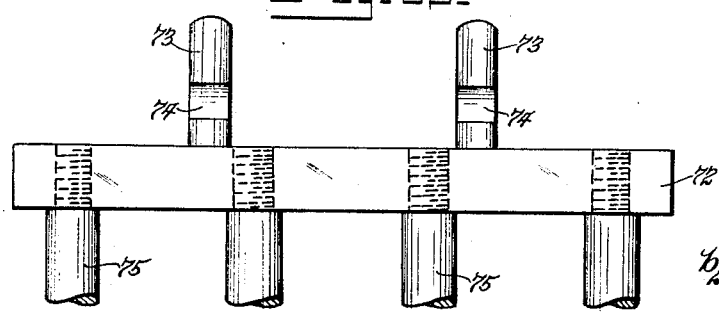

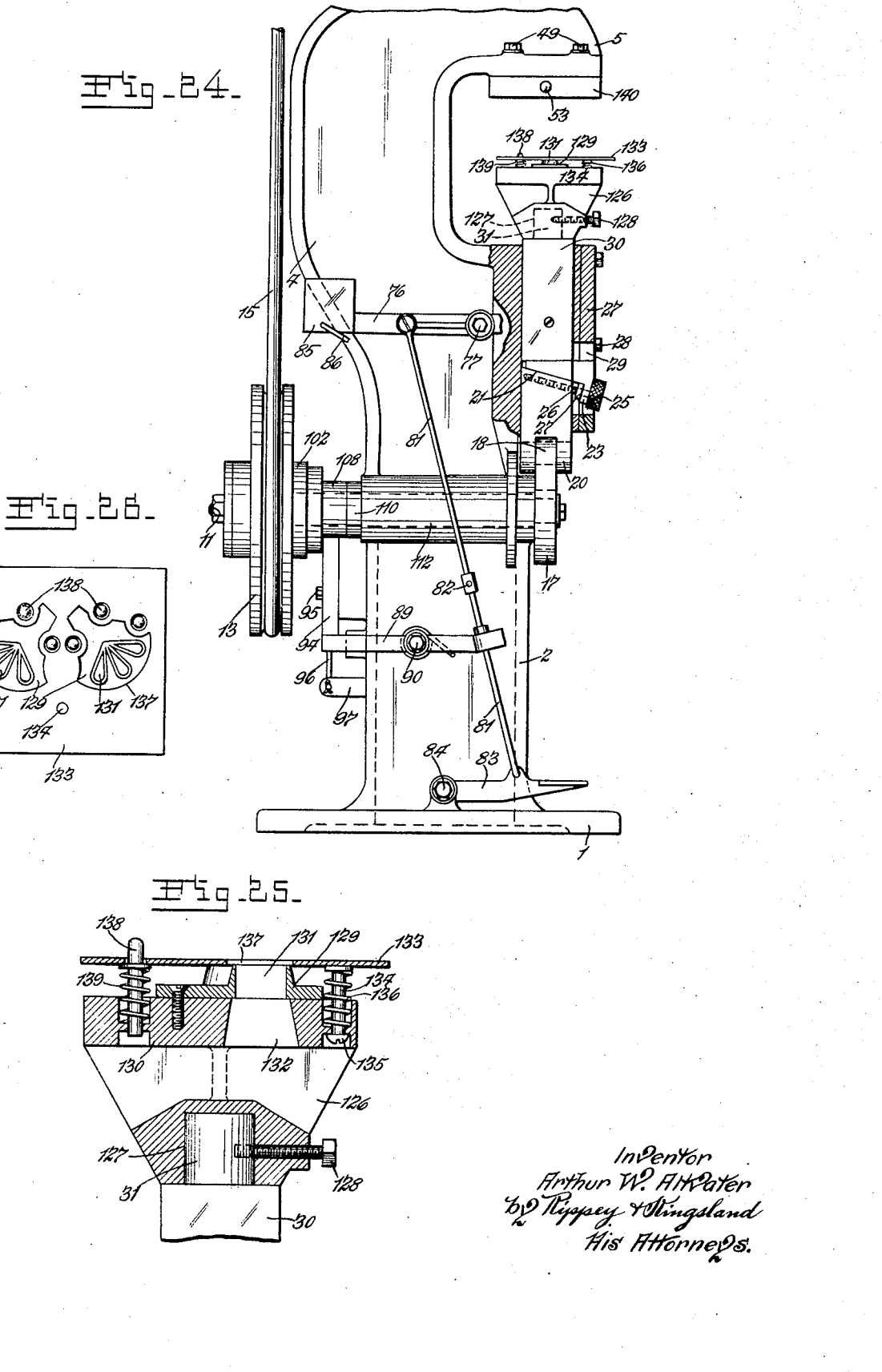

Patented Jan. 2, 1934

1,941,966

UNITED STATES PATENT OFFICE 1,941,966

CUTTING, TRIMMING, AND ORNAMENTING MACHINE

Arthur W. Altvater, University City, Mo.

Application April 20, 1931. Serial No. 531,449

38 Claims. (Cl. 164—25)

This invention relates to cutting, trimming and ornamenting machines.

One object of this invention is to provide an improved machine constructed and designed and adapted for application to many uses, including the making of ornamental cut-outs in shoe parts and shoe uppers, the trimming of different classes of work, such as shoe parts, shoe uppers and the like, and otherwise ornamenting and shaping and giving form to shoe parts and shoe uppers by producing ornamental outlines, configurations and demarcations thereon and therein.

Another object of the invention is to provide a machine of the character and type and for the purposes mentioned having improved means and devices for rigidly supporting the cutting and ornamenting dies, and mechanism for supporting and pressing the work, including shoe parts and shoe uppers, against the dies by positive mechanical pressure, in order to cause the dies to perform their intended ornamenting functions.

Another object of the invention is to provide an improved machine of the character and type mentioned having rigidly supported dies in connection therewith, a device for supporting the work including shoe parts and shoe uppers in a relationship to the dies in which the upper surface of the work is clearly exposed to view, mechanism for operating said device to place the work against the adjacent ends of the dies so that the work may be readily gaged and adjusted with respect to the dies, and power mechanism for subsequently driving said support toward the dies effectively to cause the dies to cut into or through the work to complete the ornamenting operations. According to this feature of the invention, the work, such as shoe parts and shoe uppers, is placed upon the supporting device below the cutting ends of the dies, said supporting device is then manually operated and adjusted to carry the work toward and hold the work adjacent to the cutting ends of the dies, so that the work may be relatively adjusted and gaged, and then the power driving mechanism of the machine is effectively and operatively connected with means for operating and driving said supporting device to cause the dies to complete the ornamenting operation by cutting into or through the work.

According to and by this feature of the invention, the dies may be used as the gaging means for locating and gaging the work before the supporting device is operated by the power mechanism of the machine. Moreover, the invention comprises means for preventing operation of the work support by the power mechanism of the machine before, and until after, the manual mechanism has been operated to enable the operator to gage the work against the cutting ends of the dies. This feature of the invention obtains several useful results and effects. It prevents accidental cutting of the work before opportunity has been afforded to gage the work for such cutting operation; it also prevents accidents because it is impossible for the power mechanism to operate the machine until the operator is ready for such operation; it expedites the work of the operator because the operator knows that the machine is equipped with this safety mechanism and that the machine cannot be operated by the power mechanism until the operator is prepared for such operation.

Various other objects will appear from the following description, reference being made to the accompanying drawings, in which—

Fig. 1 is a perspective view of my improved machine showing the connections by which the operator moves the work support toward the cutting dies in order to enable the work to be gaged properly.

Fig. 2 is another perspective view of the machine showing the connections for controlling the power mechanism and causing the power mechanism to operate the machine after the work has been gaged.

Fig. 3 is a rear elevation of the lower portion of the machine showing the power driven mechanism therefor and the connections for controlling the same.

Fig. 4 is a side elevation with parts in section showing the connections whereby the operator may move the work support toward the ornamenting dies in order to permit the work to be properly gaged.

Fig. 5 is a sectional view on the line 5—5 of Fig. 4 showing the pivotal connection of an operating link with the eccentric disc that is attached to the power shaft.

Fig. 6 is a detail sectional view showing the device that is attached to the power driven plunger for carying the effective length of said plunger.

Fig. 7 is an enlarged view showing the clutch for effectively connecting the constantly running driving mechanism with the operating shaft, whereby said operating shaft is driven at each operation exactly one complete revolution from and to a starting point.

Fig. 8 is a detail sectional view on the line 8—8 of Fig. 7 showing part of the clutch release mechanism.

Fig. 9 is a sectional view approximately on the line 9—9 of Fig. 7.

Fig. 10 is a vertical sectional view approximately on the line 10—10 of Fig. 4.

Fig. 11 is a cross-sectional view of the power driven shaft approximately on the line 11—11 of Fig. 7.

Fig. 12 is a cross-sectional view approximately on the line 12—12 of Fig. 7, showing additional features of the clutch mechanism.

Fig. 13 is a plan view showing a gage device for the work attached to the ramming head that drives the work against the ornamenting die.

Fig. 14 is a plan view of another form of gage.

Fig. 15 is a side elevation of a die and the rigid support therefor.

Fig. 16 is a sectional view on the line 16—16 of Fig. 15.

Fig. 17 is an enlarged detail sectional view of the member shown in Fig. 16.

Fig. 18 is a cross-sectional view on the line 18—18 of Fig. 15.

Fig. 19 is an enlarged cross-sectional view on the line 19—19 of Fig. 15.

Fig. 20 is a side elevation of the die element of Fig. 15 detached from the support.

Fig. 21 is a view similar to Fig. 15, showing another die element rigidly supported by the machine.

Fig. 22 is an enlarged sectional view on the line 22—22 of Fig. 21.

Fig. 23 is a side elevation of the die element of Figs. 21 and 22 detached from the machine.

Fig. 24 is a side elevation with parts in section showing a movable die instead of a rigid die.

Fig. 25 is an enlarged sectional view of the die element.

Fig. 26 is an end elevation of the die element.

The supporting frame of the machine comprises a base 1, a pedestal 2 rising from the base 1 and having a guide 3 formed in connection with and extending forwardly beyond the front surface of the pedestal 2, a portion 4 extending upwardly from the rear side of the pedestal 2 and a forwardly extended die supporting arm 5 in connection with the frame portion 4. This provides a heavy and durable portable frame for the machine.

A table 6 is rigid on the upper end of this portable frame, and an electric motor 7 is rigidly and detachably secured to the table 6 by fasteners 8. This motor 7 rotates a shaft 9 that has a pulley 10 attached thereto.

A shaft 11 is journalled for rotation in a bearing 12 formed in the pedestal 2 below the guide 3. This shaft 11 extends horizontally from front to rear in the bearing 12. A pulley 13 is mounted on anti-friction bearings 14 on the rear end of the shaft 11, so that said pulley may rotate about said shaft while the shaft remains stationary (Fig. 7). The machine is provided with equipment whereby the shaft 11 may be intermittently rotated by the pulley 13, said shaft having a definite starting position and being rotated one complete revolution from and to said definite starting position at each intermittent rotation of said shaft by said pulley. A belt 15 engages the pulleys 10 and 13 and is constantly operated by the motor 7 when the motor is running.

The front end of the shaft 11 has an eccentric 16 attached thereto (Figs. 1, 2 and 10). The eccentric 16 is rotated by the shaft 11. Said eccentric 16 is rotative within a ring 17 having an upwardly extended link arm 18 connected by a pivot 19 with the lower end of a vertically sliding plunger 20. The plunger 20 is mounted in and is guided vertically by the guide 3.

Provision is made whereby the effective length of the plunger 20 may be varied. As shown in Fig. 6 of the drawings, the upper end of the plunger 20 is formed with a downwardly and forwardly inclined wall 21 on which a correspondingly shaped wall of an adjustable plunger head 22 is seated. The plunger head 22 has a depending arm 23. A threaded stem 24 extends through a hole in the arm 23 and is screwed in a hole in the plunger 20. The stem 24 is parallel with the inclined upper end 21 of the plunger 20, so that rotation of said stem in one direction will move the plunger head 22 upwardly along the inclined wall 21 and thus increase the effective length of the plunger 20; and rotation of the stem 24 in the opposite direction will move the plunger head 22 downwardly along the wall 21 and thereby reduce the effective length of the plunger 20. The stem 24 is provided with a head 25 that constitutes a handle whereby said stem may be rotated, as required to move the plunger head 22 to its different adjustments. The head 25 abuts against the outer side of the arm 23, and the inner side of said arm is adjacent to an abutment 26 secured on the stem 24. The head 25 and the abutment 26 engaging on opposite sides of the arm 23 are effective to move the plunger head 22 with the stem 24.

As clearly shown in Fig. 10 of the drawings, the plunger 20 is mounted between side portions of the guide 3 and, as shown in Fig. 6, said plunger is held in said guide by a plate 27. This plate 27 is detachably secured to the guide 3 by screws 28 (Figs. 1 and 2). The plate 27 has therein an opening 29 into which the front of the plunger head 22 extends and in or beyond which the head handle 25 is engageable.

An additional plunger 30 is mounted for vertical sliding movements in the guide 3 above the plunger head 22. The lower end of the plunger 30 is normally on or adjacent to the upper end of the plunger head 22. This plunger 30 is held in the guide 3 by the plate 27. The plunger 30 is formed on its upper end with a vertical extension 31 of less diameter than the plunger 30, leaving an abrupt shoulder 32 at the union of the plunger 30 with the extension 31. This shoulder 32 is above the upper end of the guide 3. The extension 31 is designed and adapted to be extended into a socket in a selected work supporting head 33.

My invention contemplates the use of selected work supporting heads of different shapes and forms, and the attachment thereof selectively and optionally to the plunger 30. Such attachment of selected work supporting heads to the plunger 30 is effected by inserting the extension 31 in a socket in the selected work supporting head, as will be understood by reference to Fig. 4 of the drawings. The work supporting head may be rigidly attached to the extension 31 by a set screw 34 screwing in a threaded hole in the work supporting head and into clamping engagement with the extension 31. Thus, any selected work supporting head, as the work supporting head 33, may be detachably and rigidly attached to the upper end of the plunger 30 for operation thereby.

My invention comprises means for supporting cutting plates and combined cutting and gage plates upon any selected head 33. As shown in Fig. 4, an angular bracket 35 has its lower end detachably secured to the plunger 30 by removable fasteners 36. This bracket extends rearwardly and upwardly to about the plane of the upper end of the head 33, and has a cutting plate or a combined cutting plate and gage 37 secured thereto by a fastener 38 and extending forwardly over and into contact with the upper end of the head 33. These cutting plates, or combined cutting and gage plates, are removable and interchangeable, so that an appropriate gage may be provided for the particular type of work, such as shoe parts and shoe uppers, that is being operated upon. For instance, in Fig. 13, a shoe upper 39 is indicated, the same being seated upon a combined cutting and gage plate 40, having gage members 41 detachably secured to the upper side thereof by removable and replaceable fasteners 42. These gages are designed and intended to receive rounded edges of the shoe upper 39 and limit inward movement of said shoe upper. These gages 41 assist in the preliminary adjustment and placement of the shoe upper, the final adjustment and gaging operation being effected by manually operating the plunger 30 to an extent to move the shoe upper into contact, or into approximate contact, with the cutting ends of the dies, so that, by observation, the operator may obtain the precise adjustment of the shoe upper before the cutting operation is performed. This is an important feature of the present invention.

Another form of combined cutting and gage plate 43 is shown in Fig. 14 for use in supporting and gaging a shoe upper or shoe part 44 having a different shape. The gage elements 45 are detachably secured to the combined cutting and gage plate 43 by removable and replaceable fasteners 46, permitting removal and replacement of the gages for purposes of repair or for substitution of different types of gages. The shoe part or shoe upper 44 has an extension 47 provided with curved edges seating against correspondingly shaped edges of the gages 45 so as to center the shoe part or shoe upper 44 on the gage plate 43 preparatory for the final gaging operation. The gage plates 40 and 43 may be detachably secured to the bracket 35 by a screw fastener 38.

The starting position of the shaft 11 is that in which the highest point of the eccentric 16 extends downwardly and the lowest point of said eccentric extends upwardly. In this starting position of the shaft 11, the eccentric 16 supports the plunger 20 at the lowest point to which said plunger is moved. It is from this definite starting position that the shaft 11 is rotated one complete revolution at each operation of said shaft.

A plate 48 having a horizontal lower surface is detachably secured to the underside of the arm 5 by removable and replaceable fasteners 49. This plate 48 has a horizontal socket 50 (Figs. 16 and 17) extending inwardly from each side edge thereof. Each of the sockets 50 intersects a vertical socket 51. The vertical sockets 51 extend vertically through the plate 48 and into the underside of the arm 5. Each socket 50 encloses a sliding lock including a head 52 rigid on the inner end of a reduced stem 53 having rigid thereon an abutment collar 54 designed and adapted to abut against the inner end of a plug 55 removably screwed into the outer end of the socket 50. A coil spring 56 is enclosed in the inner end of each socket 50, said springs being arranged so that they actuate the locking keys outwardly to positions in which the abutment collars 54 are against the plugs 55, in which positions the heads 52 extend some distance into the adjacent socket 51. The protruding outer end of the stem 53 constitutes a key adapted for manual engagement, whereby said stems may be pressed inwardly a distance to carry the heads 52 beyond the sockets 51.

Dies of different types and sizes and for cutting out different shapes in shoe parts and shoe uppers, or for embossing different designs on shoe parts and shoe uppers and other materials, or for forming other ornamental designs and out lines on the shoe parts and shoe uppers and other materials, may be optionally attached to the plate 48.

As shown in Fig. 15, a plate 57 has pins 58 projecting therefrom into the sockets 51 and having grooves 59 with which the key heads 52 are engaged. Thus the plate 57 is rigidly supported against the underside of the plate 48. The plate 57 is formed with a socket 60 in which a locking key is mounted. The locking key comprises a stem 61 having a reduced portion 62 extending from its inner end and provided with a head 63. A spring 64 encircles the stem 62 within the socket 60 and actuates the locking key to position in which the head 63 intersects vertical sockets 65. Extent of movement of the stem 61 by the spring 64 is limited by a nut 66 screwed on the end of the reduced portion 62 and adapted to engage against the side of the plate 57.

A die plate 67 has stems 68 removably engaged in the sockets 65 and having notches 69 receiving the head 63 of the locking stem. The locking stem may be moved inwardly to disengage the head 63 from the notches 69 and permit removal and replacement and substitution of different die plates 67.

The die plate 67 is formed with a series of downward projections 70 to which dies 71 of any desired form or design may be attached.

The die attachment above described is for supporting small dies 71. Larger dies may be optionally supported and used in this machine. As shown in Figs. 21, 22 and 23, a large die plate 72 has pins 73 adapted to be extended into the sockets 51 and provided with notches 74 to obtain locking engagement with the locking heads 52. This die plate 72 has downward projections 75 designed and adapted to support cutting and ornamenting dies of different types and sizes, such as the dies 71, or dies of other designs.

It is now clear that the cutting and ornamenting dies are rigidly supported above the work supporting ramming head 33, and the dies of different designs and shapes and sizes may optionally be supported above ramming heads of optionally different designs, types and sizes. Thus, work of different classes may be supported on this machine by providing and using work supporting ramming heads 33 of appropriate sizes and designs. And dies of different forms may be optionally used.

A lever 76 is mounted on a pivot 77 supported by one side of the frame 2. The front end of the lever 76 has a fork 78 (Fig. 1) engaging a projection 79 rigid with and extending laterally from the plunger 30 through a slot 80 in one side of the guide 3. A link composed of sections 81 adjustably connected by a coupling 82 has one end pivoted to the lever 76 rearwardly from the pivot 77, and has its lower end pivoted to a treadle lever 83. The lever 83 is mounted on a pivot 84. Depression of the treadle lever 83 operates the lever 76 effectively to cause said lever to raise the plunger 30 to an extent to place the work on the ramming head 33 against or adjacent to the lower ends of the dies 71, so that the work may be adjusted and gaged accurately with respect to said dies, and so that such adjustment may be visually determined before operation of the ramming head by the power mechanism.

A counter-balance weight 85 (Figs. 1 and 4) is adjustable along the free rear end of the lever 76 in order partially to counter-balance the weight of the plunger 30 and the parts supported thereby.

A clamping set screw 86 is screwed into the counter-balance weight 85 and is adapted to clamp against the lever 76 in order to hold the counter-balance weight in any of its adjusted positions on said lever. The clamping set screw 86 may be released to permit adjustment of the counter-balance weight along the lever and tightened as desired.

An abutment 87 on the link 81 engages above a fork 88 on the front end of an angular lever 89. The lever 89 is mounted on a pivot 90 on which is supported a coil spring 91 having one end extending under the forward portion of the lever 89 and acting to raise the front end of said lever 89 and thereby raise the link 81. Thus, the spring 91 is effective, through the link 81 and the lever 76 and the connection of said lever 76 with the plunger 30, to move said plunger, and thereby the ramming head 33, downwardly to their idle or starting positions.

The rear end of the lever 89 has a lateral projection 92 which, in idle position, is opposite the adjacent laterally extended end 93 of a clutch controlling lever 94. The clutch controlling lever 94 is an angular lever and is supported on a pivot 95. The upper end of a link 96 is pivoted to one arm of the lever 94 (Figs. 2 and 3), and the lower end of said link 96 is pivoted to the rear end of a lever 97. The lever 97 is supported on a pivot 98 and has its front end connected by a link 99 with the rear end of a treadle lever 100 that is mounted on a pivot 101.

From the foregoing description and by reference to Fig. 3 of the drawings, it is clear that it is impossible to operate the treadle lever 100 effectively, and it is, therefore, impossible to operate the clutch controlling lever 94 effectively without first depressing the treadle lever 83 to raise the abutment 92 out of the way of the end 93 of said clutch controlling lever 94. This is an embodiment of means whereby operation of the ramming head 33 by the power mechanism is positively prevented until said ramming head has been manually operated and moved close enough to the dies 71 to enable the work to be properly gaged and to close the space between the ramming head and the dies so that it is impossible for the fingers of the operator to be placed between the ramming head and the cutting dies. Thus, this mechanism serves the double function of positively preventing the power mechanism from operating the ramming head until the operator has had ample opportunity to gage the work; and also positively preventing the power mechanism from operating the ramming head when there is any opportunity for the fingers of the operator to be injured by the cutting dies as a result of the operation of the ramming head.

A clutch member 102 (Figs. 7, 9 and 11) is detachably secured to the hub of the pulley 13 by removable and replaceable fasteners 103. The side of the disc away from the hub of the pulley 13 is formed with recesses 104 having abrupt shoulders 105 at their ends adapted to engage a sliding clutch member 106 when it is desired to rotate the shaft 11. The clutch member 106 is slidable along the shaft 11 within a guide slot 107 formed in a collar 108 that is keyed on the shaft 11 (Fig. 9). A spring 109 has one end pressing against the clutch member 106 and the opposite end engaging and supported by an eccentric collar 110 keyed on the shaft 11. The power and energy of this spring 109 is utilized to actuate the clutch member 106 toward and into contact with the clutch shoulders 105, which are constantly rotating with the pulley 13 when the motor 7 is running. The clutch member 106 is formed with a notch 111 having a beveled wall 112. The lever 94 has an arm 113 provided with a beveled surface 114. A spring 115 is effective to operate the lever 94 to position in which the end of the lever is against the collar 108. That portion of the clutch member 106 containing the notch 111 extends beyond the periphery of the collar 108, so that the beveled wall 112 is beyond the periphery of said collar 108. Accordingly, if the lever 94 is moved outwardly by depression of the treadle 100, said lever will be moved out of engagement with the beveled wall 112 of the clutch member 106. This permits the spring 109 to move the clutch member 106 longitudinally into position to be engaged by one of the shoulders 105, which are constantly rotating with the pulley 13. The pulley 13 will thereby rotate the shaft 11. Immediate release of the treadle 100 permits the spring 115 immediately to engage the lever 113 with the periphery of the collar 108, with the result that the beveled wall 112 of the clutch member 106 will rub against the beveled wall 114 of the lever 113 and thereby disengage the clutch member 106 from the clutch shoulder 105.

When the clutch member 106 is disengaged from the clutch shoulder 105 as described, rotation of the shaft 11 is immediately stopped in the position from which said shaft 11 started to rotate. Accordingly, said shaft has a definite starting and stopping position, which is at the beginning and end of each complete revolution. A brake shoe 116 is pivoted on a lever 117 and operates against the periphery of the eccentric 110. The high point of the eccentric 110 is in alinement with the clutch member 106. The lever 117 is mounted in a supporting bracket 118. Pressure of the brake shoe 116 against the eccentric 110 is maintained by a nut 119 screwed on a stem 120 projecting from the bearing 12. A spring 121 is mounted on the stem 120 between the lever 117 and said bearing 12.

This machine is used by mounting any desired dies in connection with the machine in the manner described and securing any desired work support and ramming head in connection with the plunger 30, as already explained. An appropriate cutting plate, or combined cutting plate and gage, 37 is attached to the supporting bracket 35. The work, such as a shoe part or shoe upper, is then placed on the cutting plate, or combined cutting plate and gage. Then the treadle lever 83 is depressed to raise the ramming head toward and close to the ends of the cutting dies, so that the work may be accurately adjusted and gaged before operation of the ramming head by the power mechanism. The ramming head is moved so close to the cutting dies that it is impossible for the fingers of the operator to remain between the ramming head and the dies. Until the lever 83 is depressed to displace the abutment 92 from its position adjacent to the end 93 of the lever 94, it is impossible to operate said lever 94 to an extent sufficient to disengage said lever 94 from the clutch member 106. Accordingly, until the ramming head has been moved close to the cutting dies, it is impossible to operate the ramming head by the power mechanism.

After the ramming head has been moved to proper position adjacent to the cutting dies to afford opportunity for proper adjustment and gaging of the work, such as shoe parts and shoe uppers, the treadle lever 100 may be operated to disengage the lever 113 from the clutch member 106. The clutch member 106 is immediately moved toward the hub of the pulley 13 and, at the proper time, is engaged by one of the shoulders 105. The lever 100 should be immediately released so as to permit the lever 94 to engage against the periphery of the collar 108, in order to disengage the clutch member 106 from the driving pulley 13 at the end of one complete revolution of the shaft 11.

This rotation of the shaft 11 causes the eccentric 16 to operate the plunger 20, and thereby the plunger 30, to drive the ramming head upwardly toward the dies and cause the dies to cut or produce the desired ornamental effects upon the work, such as shoe parts and shoe uppers.

The lever 94 has a laterally extended arm 122 (Fig. 8) formed with a socket 123 in which one end of a spring 124 is seated. The opposite end of the spring 124 is seated in a socket 125 rigid with the frame 2. The power and energy of this spring 124 is utilized to operate the lever 94 to position to release the clutch member 106. Downward movement of the treadle lever 100 to disengage the lever 94 from the clutch member 106 operates said lever 94 in opposition to the spring 124. When the treadle lever 100 is released, the spring 124 immediately moves the lever 94 to position to engage the arm 113 of said lever against the sleeve 108, so that the clutch member 106 will be disengaged from the clutch member 102 at the end of a single revolution of the shaft 11.

In Fig. 24, I have shown a construction in which a die head 126 is formed with a socket 127 that will receive the extension 31 of the sliding plunger 30. The die head 126 may be rigidly secured to the plunger by a set screw 128 screwed into the die head and adapted to clamp against the extension 31 of the plunger.

Upwardly extended dies 129 are detachably secured to the head 126 by removable and replaceable fasteners 130. The dies are seated upon the upper end of the head 126 and have therethrough openings 131 communicating with openings 132 through the die heads, so as to discharge the cut out waste material and fragments cut from the work, such as shoe parts and shoe uppers.

A stripper plate 133 is supported by pins 134 having their stems operating through holes in the die head 126. The pins 134 are provided with heads 135 and are surrounded by springs 136, whereby the stripper plate 133 is yieldingly supported. Holes 137 through the stripper plate are opposite the dies, so that the dies may pass through said holes and engage the work.

Gages comprising pins 138 project through holes in the stripper plate 133 and through holes in the die head 126. A spring 138 supports each gage 138. These gages project sufficiently above the upper surface of the stripper plate 133 to engage the side edges of the work, such as shoe parts and shoe uppers, so as to facilitate and expedite the location and placement of the work on the stripper plate preparatory to manual movement of the die to position in which the die is supported for operation of the power mechanism.

A rigid member 140 is attached to the forwardly extended arm 5 of the supporting frame by the bolts 49.

In the use of this machine, the work is placed upon the stripper plate 133 and gaged with the edges of the work against the gages 138. Then the treadle 83 is operated so as to raise the die head 126 toward the rigid plate 140. This conditions the machine for operation of the power mechanism in the manner previously described, so that the power mechanism will immediately operate upon depression of the lever 100.

The machine also may be equipped with a mirror or other type of reflector 141 attached to the front wall of the frame portion 4 rearwardly from the ramming head 33 and also rearwardly from the die head 126. The reflector device may have adjustable wings 142 which may be turned to different angles of inclination. By use of these reflector devices, the operator may readily observe the work and the rear portion of the work, including shoe parts and shoe uppers, so as to determine when the work is properly located.

As shown, an electric lamp 143 is supported below the arm 5 so that the light rays from the lamp will illuminate the work supporting frame and die elements and will also illuminate the reflectors 141 and 142. The lamp is supported substantially at the rear of the cutting instruments so that the machine may be operated without interference with the lamp and so that the lamp is out of the line of vision of the operator. Thus, as shown in Fig. 4 of the drawings, the lamp is concealed from the operator by the arm 5 of the machine frame and the elements supported thereby. However, the lamp is located in position above the reflectors 141 and 142 and above the movable member of the cutting mechanism of the machine, so that the lamp will illuminate these parts. The lamp is operated by electric circuit wires 144 controlled by a circuit switch 145, so that the light may be turned off and on according to the needs of the user of the machine. This switch 145 is not necessarily the same switch that controls the operation of the motor 7, so that the motor 7 may be operated without lighting the lamp, or the lamp may be operated without operating the motor.

It is now clear that this invention possesses many advantages over machines of different construction. The cutting dies are supported in a rigid position so that they may be utilized to aid in adjusting and gaging the work with accuracy and precision, and thus prevent the work from being spoiled, as would occur if the work were not properly adjusted before being cut by the cutting dies. The factors of utility and safety, together with speed of operation, are provided by this machine.

This application is a continuation, in part, of my co-pending application Serial No. 334,934, filed January 25, 1929.

The construction and arrangement of the elements of the machine may be varied otherwise than as indicated herein without departure from the nature and principle of the invention. I do not restrict myself in unessential respects but what I claim and desire to secure by Letters Patent is:—

1. In a machine of the character described, a rigid supporting frame, a downwardly extended die rigidly supported by said frame, a rigid guide supported by said frame below said die, an element mounted for sliding movements in said guide, a work support supported by said element above said guide and below said die, manual means connected with an intermediate portion of said element for moving said work support upwardly toward said die, and power mechanism engaging the lower end of said element for driving said work support toward said die after said work support has been moved by said manual means as aforesaid.

2. In a machine of the character described, a rigid supporting frame, a downwardly extended die rigidly supported by said frame, a rigid guide supported by said frame below said die, an element mounted for sliding movements in said guide, a work support supported by said element above said guide and below said die, manual means connected with an intermediate portion of said element for moving said work support upwardly toward said die, power mechanism engaging the lower end of said element for driving said work support toward said die after said work support has been moved by said manual means as aforesaid, and means for preventing operation of said work support by said power means while said manual means remains unoperated.

3. In a machine of the character described, the combination of a rigid frame, a die rigidly supported by said frame and extending downwardly at the front thereof, a vertically reciprocating work support below said die, means for guiding said support, manual means for moving said work support upwardly to locate the work on said support in gaging position with respect to the die, a rotary shaft having a definite starting and stopping position, constantly running power mechanism for rotating said shaft, mechanism for causing said power mechanism to rotate said shaft intermittently from and to said starting and stopping position, and means preventing operation of said last named mechanism while said manual means remains unoperated.

4. In a machine of the character described, the combination of a work support, a die rigidly supported in position to permit insertion of the work between the die and the support, a lever having a connection for moving the work support toward the die and holding the work support stationary adjacent to the die while the work is gaged relative to the die, mechanism for operating said lever, a spring for operating said lever to move said work support away from the die, power mechanism having a connection other than said connection of said lever for driving said work support toward the die, devices controlling operation of said power mechanism, and means preventing operation of said devices while said connections for operating said lever remain unoperated.

5. In a machine of the character described, the combination of a rigid support, a die rigidly mounted on said support, a movable support for the work, means on said rigid support for supporting and guiding said movable support, gage devices in connection with said movable support, power mechanism having a connection for driving said movable support toward said die, manual mechanism having a connection other than said connection of said power mechanism for moving said support toward said die, and means preventing operation of said support by said power mechanism while said manual mechanism remains unoperated.

6. In a machine of the character described, the combination of a rigid support, means for supporting selected dies in connection with said support, a sliding member mounted in said support, means for holding selected work supports in connection with said sliding member, manual connections for operating said sliding member to move the selected work support that is in connection with said sliding member toward the die that is mounted in connection with said rigid support, and power mechanism having connection with said sliding member apart from said manual connections for driving said sliding member to press the work against the die.

7. In a machine of the character described, the combination of a rigid support, means for supporting selected dies in connection with said support, a sliding member mounted in said support, means for holding selected work supports in connection with said sliding member, manual connections for operating said sliding member to move the selected work support that is in connection with said sliding member toward the die that is mounted in connection with said rigid support, power mechanism having connection with said sliding member apart from said manual connections for driving said sliding member to press the work against the die, and means preventing operation of said sliding member by said power mechanism while said manual connections remain unoperated.

8. In a machine of the character described, a rigid supporting frame, a downwardly facing die support rigid with said frame, means for detachably securing selected dies in rigid connection with said die support in position in which said dies extend downwardly from said support, a movable work support mounted in said frame, power mechanism having connection for driving said work support toward said dies, manual devices for moving said work support toward said dies while said power mechanism connection remains unoperated, and means for preventing operation of said power mechanism while said manual devices remain unoperated.

9. In a machine of the character described, the combination of a rigid support, a die in rigid connection with said support, a guide, a member mounted for sliding movements in said guide toward and away from said die, a work support, a part in connection with said sliding member for engaging and holding said work support, power mechanism for driving said work support toward said die, connections for driving said work support by said power mechanism, and manual connections other than said first named connections for operating said sliding member to move said work support that is in connection with said sliding member toward the die and thereafter causing said power mechanism to drive said work support.

10. In a machine of the character described, the combination of a rigid support, a die in rigid connection with said support, a guide, a member mounted for sliding movements in said guide toward and away from said die, a work support, a part in connection with said sliding member for engaging and holding said work support, manual connections for operating said sliding member to move said work support that is in connection with said sliding member toward the die, and power mechanism having connections other than said manual connections for driving said sliding member to press the work against the die.

11. In a machine of the character described, the combination of a rigid support, a die in rigid connection with said support, a guide, a member mounted for sliding movements in said guide toward and away from said die, a work support, a part in connection with said sliding member for engaging and holding said work support, manual connections for operating said sliding member to move said work support that is in connection with said sliding member toward the die, power mechanism having connections other than said manual connections for driving said sliding member to press the work against the die, and means for preventing said power mechanism from driving said sliding member while said manual connections remain unoperated.

12. In a machine of the character described, the combination of a rigid support, a die in rigid connection with said support, a member mounted for sliding movements in said support toward and away from said die, a work support, means in conenction with said sliding member for engaging and holding said work support, a cutting plate mounted on said work support, an element connected with said sliding member and holding said cutting plate in position, manual connections for operating said sliding member to move said work support toward said die to locate the work on said support adjacent to said die, and power mechanism controlled by said manual connections for driving said work support toward said die after movement of said work support by said manual connections.

13. In a machine of the character described, the combination of a rigid support, a die in rigid connection with said support, a member mounted for sliding movements in said support toward and away from said die, a work support, means in connection with said sliding member for engaging and holding said work support, a cutting plate mounted on said work support, an element connected with said sliding member and holding said cutting plate in position, manual connections for operating said sliding member to move said work support toward said die to locate the work on said support adjacent to said die, and power mechanism for driving said sliding member to press the work against the die.

14. In a machine of the character described, the combination of a rigid support, a die in rigid connection with said support, a member mounted for sliding movements in said support toward and away from said die, a work support, means in connection with said sliding member for engaging and holding said work support, a cutting plate mounted on said work support, an element connected with said sliding member and holding said cutting plate in position, manual connections for operating said sliding member to move said work support toward said die to locate the work on said support adjacent to said die, power mechanism for driving said sliding member to press the work against the die, and means preventing driving of said sliding member by said power mechanism while said manual connections remain unoperated.

15. In a machine of the character described, the combination of a rigid support, means in connection with the upper end of said support for rigidly supporting a downwardly extended die, a vertically movable work support below said die for supporting and moving the work upwardly against said die, manual means for moving said work support upwardly to place the work adjacent to the die, a rotary shaft mounted in said rigid support below said work support, devices controlled by said manual means for rotating said shaft intermittently and stopping said shaft in a definite starting position, and mechanism for operating said work support by said shaft to press the work against the die.

16. In a machine of the character described, the combination of a rigid support, means in connection with the upper end of said support for rigidly supporting a downwardly extended die, a vertically movable work support below said die for supporting and moving the work upwardly against said die, manual means for moving said work support upwardly to place the work adjacent to the die, a rotary shaft mounted in said rigid support below said work support, devices controlled by said manual means for rotating said shaft intermittently and stopping said shaft in a definite starting position, mechanism for operating said work support by said shaft to press the work against the die, and means for preventing the operation of said work support by said shaft while said manual connections remain unoperated.

17. In a machine of the character described, the combination of a rigid support, a downwardly extended die rigid with said support, a sliding member mounted in said support, a head member, means for detachably securing said head member to said sliding member for operation thereby, a part above said head member for supporting the work, means other than said head member supported by said sliding member for holding said part in position on said head member to support the work, and mechanism for operating said head member to press the work against the die.

18. In a machine of the character described, the combination of a rigid support, a downwardly extended die rigid with said support, a sliding member mounted in said support, a head member, means for detachably securing said head member to said sliding member for operation thereby, a part above said head member for supporting the work, means other than said head member supported by said sliding member for holding said part in position on said head member to support the work, and manual connections for operating said head member to move the work adjacent to the die.

19. In a machine of the character described, the combination of a rigid support, a downwardly extended die rigid with said support, a sliding member mounted in said support, a head member, means for detachably securing said head member to said sliding member for operation thereby, a part above said head member for supporting the work, means other than said head member for holding said part in position to support the work, manual connections for operating said head member to move the work adjacent to the die, and power mechanism for driving said head member to press the work against the die.

20. In a machine of the character described, the combination of a rigid support, a downwardly extended die rigid with said support, a sliding member mounted in said support, a head member, means for detachably securing said head member to said sliding member for operation thereby, a part above said head member for supporting the work, means other than said head member for holding said part in position to support the work, manual connections for operating said head member to move the work adjacent to the die, power mechanism for driving said head member to press the work against the die, and means for preventing operation of said head member by said power mechanism while said manual connections remain unoperated.

21. In a machine of the character described, the combination of a rigid support, a die mounted in rigid connection with said support, a member mounted for sliding movements in said support toward and away from said die, a head member, detachable means for securing said head member in connection with said sliding member, a gage element, a bracket attached to said sliding member apart from said head member, and means holding said gage element in connection with said bracket in position upon said head for gaging the work preparatory to movement of said head toward said die.

22. In a machine of the character described, the combination of a rigid support, a die mounted in rigid connection with said support, a member mounted for sliding movements in said support toward and away from said die, a head member, detachable means for securing said head member in connection with said sliding member, a gage element, a bracket attached to said sliding member apart from said head member, means holding said gage element in connection with said bracket in position upon said head for gaging the work preparatory to movement of said head toward said die, and manual connections for moving said head toward said die to locate the work adjacent to the die for final gaging operations.

23. In a machine of the character described, the combination of a rigid support, a die mounted in rigid connection with said support, a member mounted for sliding movements in said support toward and away from said die, a head member, detachable means for securing said head member in connection with said sliding member, a gage element, means in connection with said sliding member for holding said gage element in position upon said head for gaging the work preparatory to movement of said head toward said die, manual connections for moving said head toward said die to locate the work adjacent to the die for final gaging operations, and power mechanism for driving a part of said manual connections and thereby said head to press the work against the die.

24. In a machine of the character described, the combination of a rigid support, a die mounted in rigid connection with said support, a member mounted for sliding movements in said support toward and away from said die, a head member, detachable means for securing said head member in connection with said sliding member, a gage element, means in connection with said sliding member for holding said gage element in position upon said head for gaging the work preparatory to movement of said head toward said die, manual connections for moving said head toward said die to locate the work adjacent to the die for final gaging operations, power mechanism for driving a part of said manual connections and thereby said head to press the work against the die, and means controlled by said manual connections preventing operation of said part of said manual connections by said power mechanism while said manual connections remain unoperated.

25. In a machine of the character described, a rigid frame, a die support rigid with said frame, a die, means for securing said die rigidly to said die support, a sliding member mounted in said frame below said die, a head member, means for holding said head member in rigid connection with said sliding member, a part seated on said head member for supporting the work, means in connection with said sliding member for holding said part in position on said head member, a gage for the work on said part, manual connections for operating said sliding member and thereby said head member and said part to place the work adjacent to said die and for holding the work adjacent to said die while the work is being gaged and adjusted relative to said die, and mechanism for driving said sliding member as required to drive the work against the die.

26. In a machine of the character described, a rigid frame, a die support rigid with said frame, a die, means for securing said die rigidly to said die support, a sliding member mounted in said frame below said die, a head member, means for holding said head member in rigid connection with said sliding member, a part seated on said head member for supporting the work, means in connection with said sliding member for holding said part in position on said head member, a gage for the work on said part, manual connections for operating said sliding member and thereby said head member and said part to place the work adjacent to said die and for holding the work adjacent to said die while the work is being gaged and adjusted relative to said die, mechanism for driving said sliding member as required to drive the work against the die, and means preventing said mechanism from driving said head member while said manual connections remain unoperated.

27. In a machine of the character described, the combination of a rigid frame, a downwardly extended die rigid with said frame, a sliding member mounted in said frame below said die, a head member, means for holding said head member in detachable connection with said sliding member, a gage, means other than said head member holding said gage in connection with said sliding member, manual connections for moving said sliding member and thereby said head member toward said die and for supporting said head member adjacent to said die while the work is being adjusted relative to said die, and power mechanism for driving said sliding member and thereby said head member to press the work against the die.

28. In a machine of the character described, the combination of a rigid frame, a downwardly extended die rigid with said frame, a sliding member mounted in said frame below said die, a head member, means for holding said head member in detachable connection with said sliding member, a gage, means other than said head member holding said gage in connection with said sliding member, manual connections for moving said sliding member and thereby said head member toward said die and for supporting said head member adjacent to said die while the work is being adjusted relative to said die, power mechanism for driving said sliding member and thereby said head member to press the work against the die, and means preventing said power mechanism from driving said sliding member and said head member while said manual connections remain unoperated.

29. In a machine of the character described, the combination of a rigid frame, a downwardly extended die rigidly supported at the front of said frame, a vertical sliding member mounted in the front of said frame below said die, a head member, means for holding said head member in rigid connection with said sliding member, a bracket attached to said sliding member, means supported by said bracket for gaging the work above said head member for movement toward and into contact with said die, and manual connections for operating said sliding member and thereby said head member toward said die and for supporting said members in position to support the work adjacent to said die while the work is being finally adjusted for operation against the die.

30. In a machine of the character described, the combination of a rigid frame, a downwardly extended die rigidly supported at the front of said frame, a vertical sliding member mounted in the front of said frame below said die, a head member, means for holding said head member in rigid connection with said sliding member, means for gaging the work above said head member for movement toward and into contact with said die, manual connections for operating said sliding member and thereby said head member toward said die and for supporting said members in position to support the work adjacent to said die while the work is being finally adjusted for operation against the die, and power mechanism having connections other than said manual connections for driving said sliding member and thereby said head member to press the work against the die after the work has been adjusted as aforesaid.

31. In a machine of the character described, the combination of a rigid frame, a downwardly extended die rigidly supported at the front of said frame, a vertical sliding member mounted in the front of said frame below said die, a head member, means for holding said head member in rigid connection with said sliding member, means for gaging the work above said head member for movement toward and into contact with said die, manual connections for operating said sliding member and thereby said head member toward said die and for supporting said members in position to support the work adjacent to said die while the work is being finally adjusted for operation against the die, power mechanism having connections other than said manual connections for driving said sliding member and thereby said head member to press the work against the die after the work has been adjusted as aforesaid, and means for preventing operation of said sliding member and said head member by said power mechanism while said manual connections remain unoperated.

32. In a machine of the character described, a rigid upright frame, a downwardly facing arm rigid with the upper end of said frame, a die having a cutting end, means in connection with said arm for rigidly supporting said die in position in which said cutting end projects downwardly, a horizontal rotary shaft in the lower portion of said frame, a sliding work support between said shaft and said die, manual means for moving said work support toward said die and for supporting said support adjacent to said die while the work on said support is being adjusted relative to said die, and mechanism including means other than said manual means for driving said work support by said shaft after said manual connections have been operated.

33. In a machine of the character described, a rigid upright frame, a downwardly facing arm rigid with the upper end of said frame, a die having a cutting end, means in connection with said arm for rigidly supporting said die in position in which said cutting end projects downwardly, a horizontal rotary shaft in the lower portion of said frame, a sliding work support between said shaft and said die, manual means for moving said work support toward said die and for supporting said support adjacent to said die while the work on said support is being adjusted relative to said die, mechanism including means other than said manual means for driving said work support by said shaft after said manual connections have been operated, and means for preventing said mechanism from driving said work support while said manual connections remain unoperated.

34. In a machine of the character described, a rigid upright frame, a downwardly facing arm rigid with the upper end of said frame, a die having a cutting end, means in connection with said arm for rigidly supporting said die in position in which said cutting end projects downwardly, a horizontal rotary shaft extending from front to rear in the lower portion of said frame, a sliding work support between the forward end of said shaft and said die, manual means for moving said work support toward said die and for supporting said support adjacent to said die while the work on said support is being adjusted relative to said die, a sliding plunger unmoved by said manual means and in vertical alinement with said work support for driving said work support by said shaft after said manual connections have been operated, means for preventing said mechanism from driving said work support while said manual connections remain unoperated, and means for stopping said shaft in a definite starting position at the end of each complete revolution of said shaft.

35. In a machine of the character described, the combination of a rigid upright frame, a die rigidly supported by the upper portion of said frame and having a downwardly extended cutting end, a rotary shaft extending from front to rear and journalled in the lower portion of said frame and having a definite starting and stopping position, a work support mounted between the forward end of said shaft and said die, manual connections for moving said work support to locate the work thereon adjacent to said die, constantly running power mechanism for rotating said shaft from and to said definite starting position, devices for operatively connecting said power mechanism with said shaft, means normally holding said devices in position to prevent operative connection of said driving mechanism with said shaft, connections preventing operation of said means and thereby preventing said devices from effecting the driving connection of said power mechanism with said shaft while said manual connections remain unoperated, and a vertically sliding plunger pivoted to said shaft and unmoved by said manual means for operating said work support by said shaft after operation of said manual means.

36. In a machine of the character described, the combination of a rigid upright frame, a die rigidly supported by the upper portion of said frame and having a downwardly extended cutting end, a rotary shaft extending from front to rear and journalled in the lower portion of said frame and having a definite starting and stopping position, a vertically sliding plunger pivoted to said shaft, a work support mounted between the forward end of said shaft and said die, manual connections unconnected with said plunger for moving said work support to locate the work thereon adjacent to said die, constantly running power mechanism for rotating said shaft from and to said definite starting position, devices for operatively connecting said power mechanism with said shaft, means normally holding said devices in position to prevent operative connection of said driving mechanism with said shaft, connections preventing operation of said means and thereby preventing said devices from effecting the driving connection of said power mechanism with said shaft while said manual connections remain unoperated, and automatic mechanism for causing said means to disconnect said devices from said power mechanism and to stop said shaft in said definite starting position.

37. A machine of the character described comprising a rigid frame, an abutment element supported at the front of said frame, a head supported at the front of said frame, a die element supported by said head in vertical alinement with said abutment element for cooperation therewith to cut into work between said elements, a support carried by said head for supporting the work spread across said die element, a rotary shaft extending from front to rear and supported by said frame below said head, manual means for moving said head and thereby said die element toward said abutment element and for moving said die element from said abutment element, a plunger pivoted to and extending upwardly from the forward end of said shaft in alinement with and unattached to said manual means, a constantly operating driving mechanism, means for rotating said shaft by said driving mechanism intermittently in one direction from and to a starting position, and means controlled by said manual means preventing rotation of said shaft by said mechanism while said manual means remains unoperated.

38. A machine of the character described comprising a rigid frame, a solid element supported at the front of said frame, a die element supported at the front of said frame in vertical alinement with said solid element for cooperation therewith to cut into work between said elements, a support for supporting the work spread flatwise between said elements, a rotary shaft extending from front to rear and supported by said frame below said elements, manual means for moving said support and one of said elements toward the other element and for moving said one element from said other element, a plunger pivoted to and extending upwardly from the forward end of said shaft in alinement with and unattached to said manual means, a constantly operating driving mechanism, means for rotating said shaft by said driving mechanism intermittently in one direction from and to a definite starting position, and means controlled by said manual means preventing rotation of said shaft by said mechanism while said manual means remains unoperated.

ARTHUR W. ALTVATER.